United States Patent
Passman et al.

(10) Patent No.: US 11,345,327 B2
(45) Date of Patent: May 31, 2022

(54) THROTTLE SIGNAL CONTROLLER FOR A DYNAMIC HYBRID VEHICLE

(71) Applicant: XL Hybrids, Inc., Boston, MA (US)

(72) Inventors: Bill Passman, Lexington, MA (US); Tejas Chafekar, Newton, MA (US)

(73) Assignee: XL Hybrids, Inc., Boston, MA (US)

( * ) Notice: Subject to any disclaimer, the term of this patent is extended or adjusted under 35 U.S.C. 154(b) by 219 days.

(21) Appl. No.: 16/531,527

(22) Filed: Aug. 5, 2019

(65) Prior Publication Data

US 2020/0039499 A1 Feb. 6, 2020

Related U.S. Application Data

(60) Provisional application No. 62/714,905, filed on Aug. 6, 2018.

(51) Int. Cl.
*B60W 20/10* (2016.01)
*B60W 10/06* (2006.01)
*B60W 10/08* (2006.01)

(52) U.S. Cl.
CPC ............ *B60W 20/10* (2013.01); *B60W 10/06* (2013.01); *B60W 10/08* (2013.01); *B60W 2510/244* (2013.01); *B60W 2540/10* (2013.01); *B60W 2710/0666* (2013.01); *B60W 2710/08* (2013.01)

(58) Field of Classification Search
CPC ...... B60W 20/10; B60W 10/06; B60W 10/08; B60W 2510/244; B60W 2710/0666; B60W 2710/08; B60W 2540/10; B60W 2520/10; B60W 50/10; Y02T 10/62
See application file for complete search history.

(56) References Cited

U.S. PATENT DOCUMENTS

| | | | |
|---|---|---|---|
| 6,846,566 B2 | 1/2005 | Seo et al. | |
| 8,155,814 B2 | 4/2012 | Tamai et al. | |
| 8,670,888 B1 * | 3/2014 | Brenner | B60W 20/15 701/22 |
| 8,718,896 B2 * | 5/2014 | Wang | B60W 20/00 701/82 |
| 8,855,844 B2 | 10/2014 | Schwindt | |
| 9,605,606 B2 | 3/2017 | Dufford et al. | |
| 9,656,652 B2 | 5/2017 | Oh et al. | |
| 9,824,587 B2 | 11/2017 | Chundrlik, Jr. et al. | |

(Continued)

*Primary Examiner* — Brian P Sweeney
(74) *Attorney, Agent, or Firm* — Fish & Richardson P.C.

(57) ABSTRACT

A computing device-implemented method comprises receiving information representative of a state of charge of an energy storage device of a vehicle that includes an alternative fuel propulsion system, receiving information representative of a performance measure of the vehicle for a period of time, receiving information representative of a position of an accelerator pedal of the vehicle, determining an amount of torque required by a second propulsion system to send to a driveshaft of the vehicle from the received information representative of a position of a pedal, determining an amount of torque assistance required to send to a driveshaft of the vehicle from the alternative fuel propulsion system included in the vehicle from the information representative of a performance measure of the vehicle and the information representative of the state of charge, and adjusting an amount of torque required by a second propulsion system using the determined torque assistance.

30 Claims, 8 Drawing Sheets

(56) References Cited

U.S. PATENT DOCUMENTS

| | | |
|---|---|---|
| 10,046,752 B2 | 8/2018 | Ogawa et al. |
| 10,106,149 B2 | 10/2018 | Zhao et al. |
| 10,107,390 B2 | 10/2018 | Zhao et al. |
| 10,267,412 B2 | 4/2019 | Kuang et al. |
| 10,377,241 B2 | 8/2019 | Inoue et al. |
| 10,439,427 B2 | 10/2019 | Salter et al. |
| 10,814,860 B1 | 10/2020 | Gaither |
| 11,002,556 B2 | 5/2021 | Smith et al. |
| 2002/0023437 A1 | 2/2002 | Kanazawa et al. |
| 2003/0184152 A1 | 10/2003 | Cikanek et al. |
| 2005/0151420 A1 | 7/2005 | Crombez et al. |
| 2006/0022519 A1 | 2/2006 | Ji et al. |
| 2008/0314663 A1 | 12/2008 | Yamazaki et al. |
| 2009/0118887 A1 | 5/2009 | Minarcin et al. |
| 2009/0118888 A1 | 5/2009 | Minarcin et al. |
| 2010/0042277 A1 | 2/2010 | Naik et al. |
| 2010/0052888 A1 | 3/2010 | Crowe et al. |
| 2010/0057280 A1 | 3/2010 | Crowe et al. |
| 2010/0113214 A1 | 5/2010 | Krueger et al. |
| 2010/0250083 A1 | 9/2010 | Takahashi et al. |
| 2010/0256835 A1 | 10/2010 | Mudalige |
| 2011/0066308 A1 | 3/2011 | Yang et al. |
| 2011/0093177 A1 | 4/2011 | Horn |
| 2011/0118920 A1 | 5/2011 | Kim |
| 2011/0172864 A1 | 7/2011 | Syed et al. |
| 2011/0246012 A1 | 10/2011 | McClain |
| 2013/0206491 A1 | 8/2013 | Kor et al. |
| 2013/0245866 A1 | 9/2013 | Kuretake |
| 2013/0297124 A1 | 11/2013 | Be |
| 2014/0142797 A1 | 5/2014 | Otake |
| 2014/0335994 A1 | 11/2014 | Otake |
| 2015/0047916 A1 | 2/2015 | Moriki et al. |
| 2015/0239442 A1 | 8/2015 | Yamakado et al. |
| 2016/0046278 A1* | 2/2016 | Matsuzaki .......... B60W 10/103 701/22 |
| 2016/0137184 A1 | 5/2016 | Hokoi et al. |
| 2016/0152129 A1 | 6/2016 | West et al. |
| 2016/0264003 A1 | 9/2016 | Yokoyama et al. |
| 2017/0015212 A1 | 1/2017 | Mitsuoka |
| 2018/0120841 A1 | 5/2018 | Endo et al. |
| 2018/0236995 A1 | 8/2018 | Iwamoto |
| 2019/0202297 A1 | 7/2019 | Konishi et al. |
| 2019/0390970 A1 | 12/2019 | Cha et al. |
| 2020/0039498 A1 | 2/2020 | Passman et al. |
| 2021/0031781 A1 | 2/2021 | Sasaki et al. |

\* cited by examiner

THROTTLE SIGNAL CONTROLLER FOR A DYNAMIC HYBRID VEHICLE

CROSS-REFERENCE TO RELATED APPLICATIONS

This application claims the benefit under 35 U.S.C. § 119(e) of U.S. Patent Application No. 62/714,905, entitled "Throttle Signal Controller for a Dynamic Hybrid Vehicle," filed Aug. 6, 2018, which is incorporated herein by reference in its entirety.

TECHNICAL FIELD

This disclosure relates to techniques for dynamically controlling an accelerator pedal throttle signal in a hybrid electric vehicle.

BACKGROUND

With the increased interest in reducing dependency on fossil fuels, the use of alternative energy sources has been incorporated into various applications such as transportation. Both public and private transportation vehicles have been developed to run on a fuel other than traditional petroleum based fuels (e.g., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

The systems and techniques described here relate to controlling an accelerator pedal throttle signal in a hybrid electric vehicle including an alternative energy-based system (e.g., an electric motor with battery) that assists a traditional petroleum-based internal combustion engine for efficient management of combustible fuel on-board a vehicle. Through these management techniques, more efficient use of the internal combustion engine by assistance from the alternative energy system can be achieved, thereby conserving fuel. When driving short distances in particular (such as along a truck's delivery route), high acceleration is generally not needed even though the internal combustion engine alone is capable of providing that high acceleration. The systems and techniques described mitigate the effect of drivers pressing heavily on the vehicle's accelerator pedal to produce high acceleration, by intercepting the pedal's request signal, calculating the best combination of hybrid energy power and internal combustion engine power, and reducing the signal for power requested from the vehicle engine in favor of hybrid energy. This modification in signaling allows the vehicle to accelerate as the driver has requested, with the electric motor providing more of the torque and requiring a lower fuel rate from the engine. The result is similar (or in some cases, reduced) acceleration accompanied by a reduced amount of combustible fuel used.

A computing device-implemented method comprises receiving information representative of a state of charge of an energy storage device of a vehicle that includes an alternative fuel propulsion system, receiving information representative of a performance measure of the vehicle for a period of time, receiving information representative of a position of an accelerator pedal of the vehicle, determining an amount of torque required by a second propulsion system to send to a driveshaft of the vehicle from the received information representative of a position of a pedal, determining an amount of torque assistance required to send to a driveshaft of the vehicle from the alternative fuel propulsion system included in the vehicle from the information representative of a performance measure of the vehicle and the information representative of the state of charge, and adjusting an amount of torque required by a second propulsion system using the determined torque assistance.

The method can include one or more of the following features. The second propulsion system includes an internal combustion engine and the alternative fuel propulsion system is an electric motor-based system. Sending the determined torque assistance to the driveshaft of the vehicle. The performance measure represents a speed of the vehicle. Determining an amount of torque assistance comprises setting the torque assistance to zero if the information representative of the state of charge indicates that the state of charge is less than a threshold amount. Limiting the maximum amount of torque to send to the driveshaft. Adjusting the torque comprises energizing a relay. Determining an amount of torque required by a second propulsion system to send to a driveshaft of the vehicle from the received information representative of a position of a pedal.

A system comprises a computing device comprising a memory configured to store instructions, and a processor to execute the instructions to perform operations comprising receiving information representative of a state of charge of an energy storage device of a vehicle that includes an alternative fuel propulsion system, receiving information representative of a performance measure of the vehicle for a period of time, determining an amount of torque assistance required to send to a driveshaft of the vehicle from the alternative fuel propulsion system included in the vehicle from the information representative of a performance measure of the vehicle and the information representative of the state of charge, and adjusting an amount of torque required by a second propulsion system using the determined torque assistance.

The system can include one or more of the following features. The second propulsion system includes an internal combustion engine and the alternative fuel propulsion system is an electric motor-based system. Sending the determined torque assistance to the driveshaft of the vehicle. The performance measure represents a speed of the vehicle. Determining an amount of torque assistance comprises setting the torque assistance to zero if the information representative of the state of charge indicates that the state of charge is less than a threshold amount. Limiting the maximum amount of torque to send to the driveshaft. Adjusting the torque comprises energizing a relay. Determining an amount of torque required by a second propulsion system to send to a driveshaft of the vehicle from the received information representative of a position of a pedal.

One or more computer readable media storing instructions that are executable by a processing device, and upon such execution cause the processing device to perform operations comprising receiving information representative of a state of charge of an energy storage device of a vehicle that includes an alternative fuel propulsion system, receiving information representative of a performance measure of the vehicle for a period of time, receiving information representative of a position of an accelerator pedal of the vehicle, determining an amount of torque assistance required to send to a driveshaft of the vehicle from the alternative fuel propulsion system included in the vehicle from the information representative of a performance measure of the vehicle and the information representative of the state of charge, and adjusting an amount of torque required by a second propulsion system using the determined torque assistance.

The readable media can include one or more of the following features. The second propulsion system includes an internal combustion engine and the alternative fuel propulsion system is an electric motor-based system. Sending the determined torque assistance to the driveshaft of the vehicle. The performance measure represents a speed of the vehicle. Determining an amount of torque assistance comprises setting the torque assistance to zero if the information representative of the state of charge indicates that the state of charge is less than a threshold amount. Limiting the maximum amount of torque to send to the driveshaft. Adjusting the torque comprises energizing a relay. Determining an amount of torque required by a second propulsion system to send to a driveshaft of the vehicle from the received information representative of a position of a pedal.

An accelerator signal-interrupting system is known for racing cars, where a control unit receives signals from the driver pressing on the accelerator pedal. The aftermarket controller amplifies the voltage change of the received signal and relays it to the internal combustion engine's control computer. The internal combustion engine responds as if the driver had pressed the accelerator pedal twice as fast or hard as actually is the case, even if such a heavy acceleration on the part of a driver is not physically possible. While this controller intercepts the signal from the pedal, manipulates the rate of change of the signal, and presents the changed value to the engine computer, it does not implement the efficiency features of hybrid electric vehicles.

In previous after-market hybrid electric vehicle systems, the vehicle typically has a battery that can add torque to a driveshaft of the vehicle in addition to or in place of the torque added by the internal combustion engine as a driver accelerates. The driver presses the accelerator pedal, and a hybrid control computer receives the signal as broadcast by the internal combustion engine's computer. If charge is present in the battery, the hybrid control computer tells the hybrid system to add torque to the drive shaft as quickly as possible, which happens faster than the internal combustion engine can supply the extra torque demanded by the acceleration signal. The driver, sensing the acceleration, backs off the pedal, reducing fuel used.

The systems and techniques described here have many advantages over such prior signal-interrupting systems. With existing add-on hybrid systems, some of the acceleration power can be provided by the hybrid alternative energy system, but the pedal signal still asks the engine for full power in response to the acceleration. Here, the internal combustion engine is not signaled to increase the power, or signaled for a lesser increase in power than would be required absent the hybrid alternative energy system.

Advantageously, the signal modification is dynamic, responding to changing conditions. For example, the acceleration signals are adapted depending on the speed of the hybrid vehicle, battery charge, and other vehicle parameters. Failsafe features increase vehicle safety.

These and other aspects and features and various combinations of them may be expressed as methods, apparatus, systems, means for performing functions, program products, and in other ways. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The systems and techniques described here relate to controlling an accelerator pedal throttle signal in a hybrid electric vehicle including an alternative energy based system (e.g., an electric motor with battery), as well as any aftermarket hybrid systems (including hydraulic systems), that assists a traditional petroleum-based internal combustion engine for efficient management of combustible fuel onboard a vehicle. Through these management techniques, more efficient use of the internal combustion engine by assistance from the alternative energy system can be achieved, thereby conserving fuel. When driving short distances in particular (such as along a truck's delivery route), high acceleration is generally not needed even though the internal combustion engine alone is capable of providing that high acceleration. The systems and techniques described mitigate the effect of drivers pressing heavily on the vehicle's accelerator pedal to produce high acceleration, by intercepting the pedal's request signal, calculating the best combination of hybrid energy power and internal combustion engine power required, and reducing the signal for power requested from the vehicle engine in favor of hybrid energy. This modification in signaling allows the vehicle to accelerate as the driver has requested, with the electric motor providing more of the torque while requiring lower fuel rate from the engine. The result is similar (or in some cases, reduced) acceleration accompanied by a reduced amount of combustible fuel used.

Figure 1:
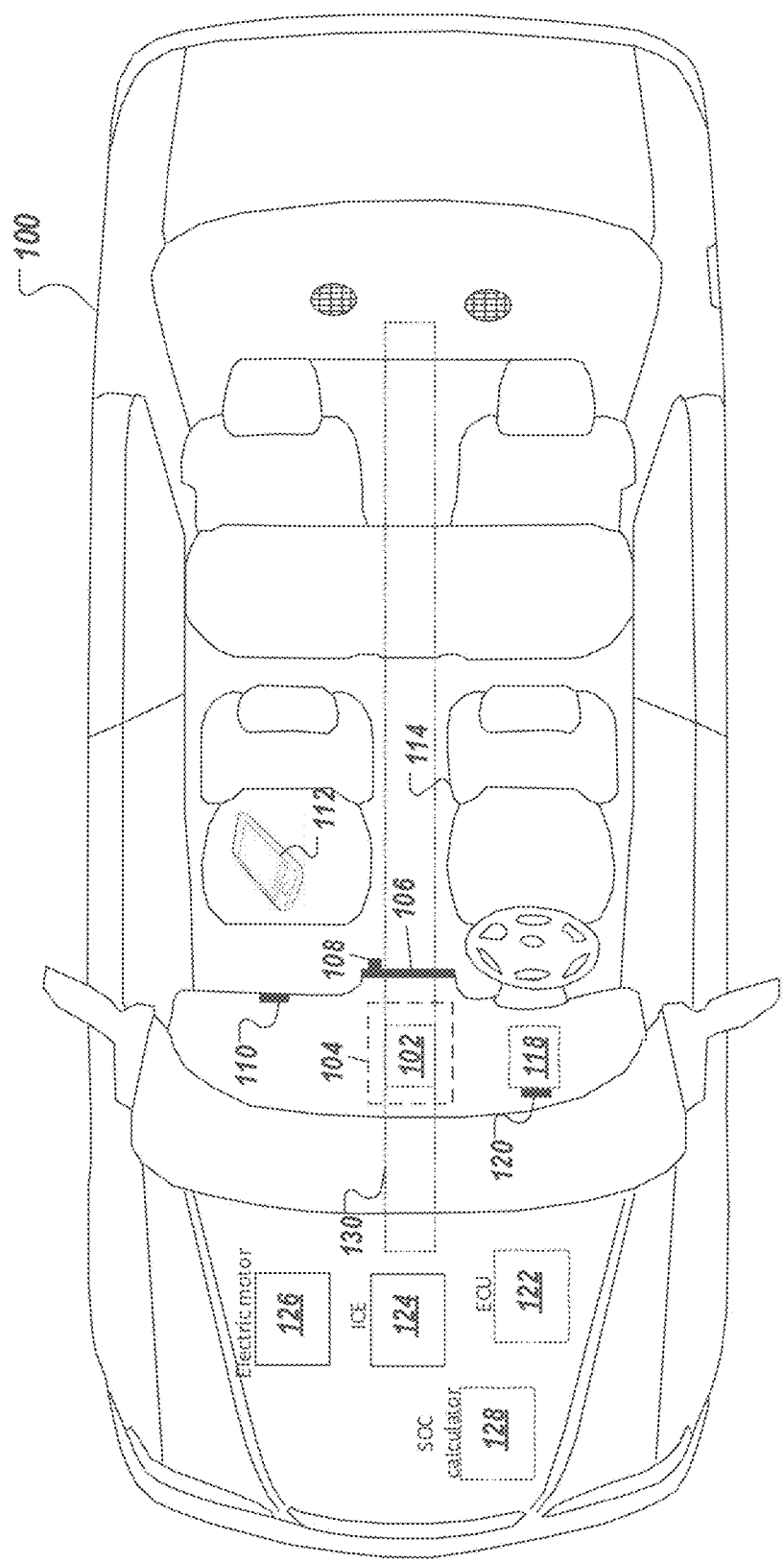
FIG. 1 illustrates a vehicle that includes a torque assistance manager for its propulsion systems.

Referring to FIG. 1, alternative fuel vehicles may solely rely upon non-petroleum energy sources, such as electricity, natural gas, biofuels etc. Rather than sole reliance on such energy sources, alternative fuel vehicles may also partially rely on an internal combustion engine along with one or more alternative energy sources. Some hybrid electric vehicles (referred to as HEVs) may operate by using energy storage devices that can be replenished by plugging into the electrical grid (and are referred to as plug-in hybrid vehicles (PHEVs)). Both HEV and PHEV use rechargeable high-voltage batteries to drive their electric propulsion motor. For electrical energy storage devices, in some arrangements, one or more techniques may be implemented for charging and recharging the devices. For example, batteries may be charged through regenerative braking, strategic charging techniques, etc. during appropriate operating periods of the vehicle. In general, while energy is typically lost as heat in conventional braking systems, a regenerative braking system may recover this energy by using an electric generator to assist braking operations. Some systems and techniques may also strategically collect (e.g., trickle-charge) energy from the internal combustion engine during periods of efficient operation (e.g., coasting, traveling, etc.) and later assist the engine during periods of lesser efficiency. For such vehicles, the electric generator can be a device separate from the electric motor, considered as a second operating mode of the electric motor, or implemented through one or more other techniques, individually or in combination. For example, solid-state switching logic can cause a single motor to act as both a motor and a generator. Energy recovered by regenerative braking may be insufficient to provide the power needed by the vehicle. To counteract this lack of energy, the electric motor may be engaged during defined periods to assist the internal combustion engine and one or more control strategies may be used to determine these time periods. Similarly, periods of time may also be determined to engage regenerative braking and strategic charging to replenish energy storage. Other operations of the vehicle (e.g., acceleration, deceleration, gear changes, etc.) may also be defined for the control strategies. By developing such strategies to control the assistance provided to internal combustion engines (during low engine efficiency periods), energy may be conserved without negatively impacting vehicle performance.

Some vehicle manufacturers may recommend operations and control strategies for entire classes of vehicles or other types of large vehicle groups (e.g., same model vehicles, same vehicle line, etc.) at particular times (e.g., at the release of the vehicle line). The amount of torque provided by an electric motor or other type of alternative fuel system may be a constant. As such, these controls are developed for static use and are generally not developed to be dynamically adjusted by the manufacturer or another entity. For example, once the vehicle is purchased, these generic controls are not adjustable.

As illustrated in FIG. 1, a top view shows an example vehicle 100 (e.g., a HEV) that is able to dynamically adjust operations to improve performance through use of its electric motor. For example, by using one or more performance measures or vehicle parameters of the vehicle 100, the amount of torque provided by the alternative fuel based system may be dynamically adjusted during operations to improve efficiency, use of energy, fuel sources, etc. To provide this capability, the vehicle includes an assistance manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the assistance manger 102 may operate in a generally autonomous manner, however, information from one or more users (e.g., identification of the vehicle operators) may be collected for operations of the assistance manager. If such input is needed, a variety of user inputs may be called upon. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the assistance manager 102. In some arrangements, the gathered information may be processed by one or more computing devices (e.g., controllers) before being provided to the assistance manager 102. To interact with the electronic display 106, a knob 108 illustrates a potential control device; however, one or more other types of devices may be used for user interaction (e.g., a touch screen display, etc.). Other types of information may also be gathered; for example, a sensor 110 (here embedded in the dashboard of the vehicle 100) may collect information such as cabin temperature, location of the vehicle (e.g., the sensor being a component of a global positioning system (GPS)) and other types of information. By collecting information such as GPS location information, additional information may be provided to the assistance manager 102 (e.g., location and destination information) for determining the level that an electric motor 126 should assist the internal combustion engine 124 or ICE 124 (e.g., by providing torque to the vehicle's driveshaft 130, shown highly schematically).

In some arrangements, information from other vehicles may be used by the assistance manager 102. For example, data may be collected from a fleet of vehicles (e.g., similar or dissimilar to the vehicle 100) and used to determine the amount of assistance to be given to the internal combustion engine 124 of the vehicle (e.g., based on similarly traveled routes).

One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the assistance manager 102 (e.g., identify driving characteristics of a vehicle operator). Similarly, portions of the vehicle itself (e.g., vehicle components) may collect information for the assistance manager 102; for example, one or more of the seats of the vehicle 100 (e.g., driver seat 114) may collect information (e.g., position of the seat to estimate the driver's weight) for being provided to the assistance manager 102.

Multiple sensors may be located internally or externally to the vehicle for collecting information. For example, an accelerator pedal position sensor 120 may detect the position of the vehicle's accelerator pedal 118. The accelerator pedal position sensor 120 is one of many sensors that are typically used by an engine control unit 122 (ECU). The ECU employs software to determine the required throttle signal of the internal combustion engine 124 by calculations from data measured by the accelerator pedal position sensor 120 and additional sensors 110 (e.g., an engine speed sensor, a vehicle speed sensor, cruise control switches). The ECU calculates how much to increase the amount of fuel being provided to the internal combustion engine 124 (e.g., by increasing fuel from the vehicle's fuel injectors, or increasing the amount a throttle valve is opened) based on a voltage signal indicating how far and quickly the accelerator pedal 118 is pressed.

To make determinations about the amount of assistance to be provided to the drivetrain 130 by the electric motor 126 instead of the internal combustion engine 124, operational information may also be collected. For example, one or more performance measures such as instantaneous miles-per-gallon (instantaneous MPG), fuel consumption rate (e.g., gallons per hour), current speed, acceleration, etc. may be collected by the various sensors 110. Information regarding the alternative fuel based system may also be collected, for example, the current state of the alternative fuel source such as a measure of the amount of energy stored in one or more storage devices residing on the vehicle. In one arrangement the state of charge is measured by a battery sensor or state of charge (SOC) calculator 128 of one or more batteries onboard the vehicle 100; this information may be provided to the assistance manager 102. Based upon the type of alternative fuel being used by the vehicle, other measures may be provided; for example, chemical levels, natural gas levels, biofuel levels, hydraulic pressure, etc. may be used by the assistance manager 102.

Along with determining the amount of assistance to be provided, the assistance manager 102 may also take part in providing an interface to components of the vehicle 100. For example, when the amount of torque to be added is quantified, the assistance manager 102 may also function as an interface with components of the vehicle 100. For example, one or more quantities associated with a determined amount of torque (e.g., a request that includes the amount of assistance) may be provided to appropriate components of the vehicle (e.g., interface modules, circuitry, etc. for controlling the operations of the internal combustion engine 124, the electric motor 126, etc.).

In some arrangements, remotely located information sources may be accessed by the vehicle. Similarly, some or all of the functionality of the assistance manager 102 may be provided from a remote location. While illustrated in the figure as residing onboard the vehicle 100, in some arrangements, the assistance manager 102 or a portion of the assistance manager may be located and executed at one or more other locations. In such situations, one or more communication techniques and methodologies may be implemented for the vehicle 100 to be provided assistance from a remotely located assistance manger. For example, one or more wireless communication techniques (e.g., radio frequency, infrared, etc.) may be utilized that call upon one or more protocols and/or standards (e.g., the IEEE 802.11 family of standards such as Wi-Fi, the International Mobile Telecommunications-2000 (IMT-2000) specifications such as 3rd generation mobile telecommunications (3G), 4th generation cellular wireless standards (4G), $5^{th}$ generation wireless broadband technology (5G), wireless technology standards for exchanging data over relatively short distances such as Bluetooth, etc.).

Figure 2:
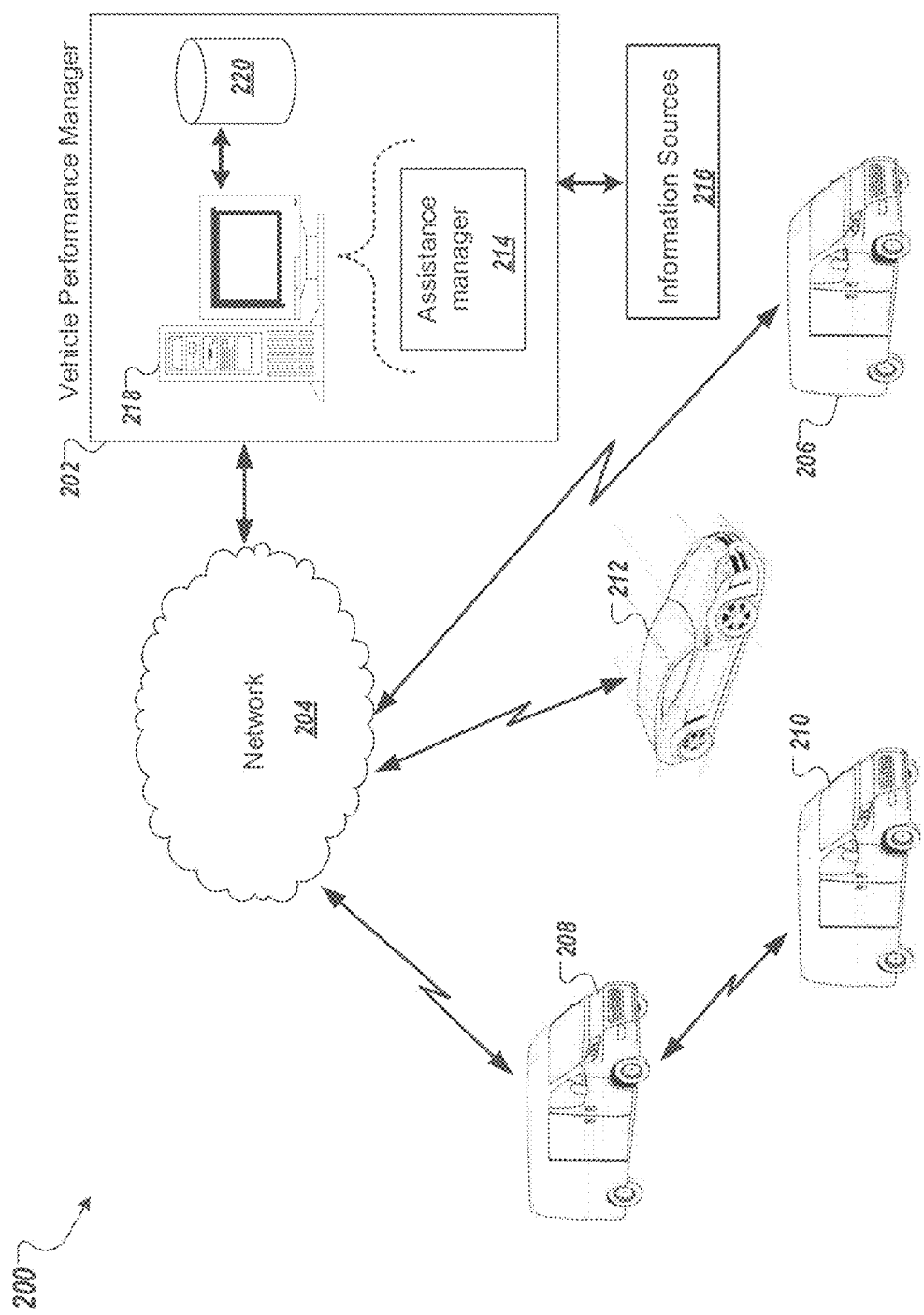
FIG. 2 illustrates a network-based assistance manager for managing propulsion systems of multiple vehicles.

Referring to FIG. 2, an information exchanging environment 200 is presented that allows information to be provided from a central location for assisting hybrid electric vehicles. In some arrangements, the information is collected from vehicles or other information sources for determining the amount of torque to provide to a vehicle 100 (shown in FIG. 1). One or more techniques and methodologies may be implemented for providing such information to the vehicles. For example, one or more communication techniques and network architectures may be used for exchanging information. In the illustrated example a vehicle performance manager 202 communicates through a network 204 (e.g., the Internet, an intranet, a combination of networks, etc.) to exchange information with a collection of vehicles (e.g., a fleet of supply trucks 206, 208, 210, and an automobile 212). In some arrangements the network architecture 204 may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle performance manager 202 and other potential network components (e.g., other vehicles, etc.).

One or more technologies may be used for exchanging information among the vehicle performance manager 202, the network 204 (or networks) and the collection of vehicles. For example, wireless technology (capable of two-way communication) may be incorporated into the vehicles for exchanging information with the vehicle performance manager 202. Along with providing and collecting information from the vehicles, the vehicle performance manger 202 may be capable of processing information (e.g., in concert with an assistance manger 214 to determine amount of assistance) and executing related operations (e.g., store collected and processed information). In some arrangements, the vehicle performance manager 202 may operate as a single entity; however, operations may be distributed among various entities to provide the functionality. In some arrangements, some functionality (e.g., operations of the assistance manger 214) may be considered a service, rather than a product, and may be attained by entering into a relationship with the vehicle performance manager 202 (e.g., purchase a subscription, enter into a contractual agreement, etc.). As such, the vehicle performance manager 202 may be considered as being implemented as a cloud computing architecture in which its functionality is perceived by clients (e.g., vehicle operators) as a service rather than a product. For such arrangements, vehicles may be provided information (e.g., quantities that represent amounts of torque that an electric motor should provide to assist a corresponding internal combustion engine) from one or more shared resources (e.g., hardware, software, etc.) used by the vehicle performance manager 202. For service compensation, one or more techniques may be utilized; for example, subscription plans for various time periods may be implemented (e.g., a monthly subscription fee for amount of assistance and operating recommendations should be provided to identified vehicles).

Similar to an onboard assistance manger (e.g., the assistance manager 102 of FIG. 1), an off-vehicle assistance manager (e.g., the assistance manager 214) may use one or more quantities from a vehicle (e.g., stored energy measure such as battery charge state, a performance measure or vehicle parameter such as speed, etc.) to determine the amount of torque assistance for fuel management. In some arrangements, quantities may also be based upon vehicle components and component operation (e.g., transmission shift points based upon engine revolutions per minute (rpm), load effects, engine torque output based on position of the accelerator pedal, etc.). In some arrangements, user-associated information (e.g., historical driving characteristics of an operator) may be used for defining amount of assistance for implementation by the assistance manager 214.

One or more types of assistance, amounts of assistance, etc. may be defined for use by the assistance manager 214 (or the onboard assistance manager 102). In some arrangements the amount of torque may be defined as a percentage that represents the amount the electric motor 126 should assist the corresponding internal combustion engine 124 (e.g., 100% to fully assist the internal combustion engine, 0% to provide no assistance to the internal combustion engine, or a specified torque value). To determine such assistance, one or more quantities originating with the vehicle may be used by the assistance manager (e.g., the onboard assistance manager 102, the off board assistance manager 214). For example, a measure of available energy may reflect the alternative fuel system's ability to assist. For the electric motor based system, the state of charge (SOC) of the battery (or batteries) onboard the vehicle may provide such a measure. Information from the internal combustion engine 124 of the vehicle may also be used to determine the assistance percentage. For example, a performance measure of the internal combustion engine such as the instantaneous MPG of the vehicle may be utilized. Such a performance measure may be provided by other quantities, for example, vehicle speed, the position of one or more of the vehicle's pedals (e.g., the accelerator pedal position, brake pedal position, etc.), data that represents collecting energy (e.g., regenerative braking, strategic charging, leeching, etc.) to replenish energy storage (e.g., charging, recharging vehicle batteries, etc.).

In one arrangement, monitoring the capability of the alternative fuel system (e.g., the current state of charge of the battery or batteries which are high voltage batteries) may be used to define and dynamically adjust the amount of assistance needed. For example, if the state of charge of the battery (or batteries) of the vehicle is above a predefined value (e.g., 40% charged), additional assistance may be provided by the electric motor 126 with the available charge. To use this assistance, a target performance measure (e.g., torque produced by the internal combustion engine 124) could be decreased in favor of an increased amount of torque from the electric motor 126. For the alternative situation, if the state of charge of the vehicle battery (or batteries) measured by the SOC calculator 128 is below the predefined or threshold value, the target performance measure (e.g., torque produced by the internal combustion engine 124) may be unchanged so no assistance is requested from the electric motor 126 (e.g., the amount of assistance provided by battery power may be zero).

Along with information being provided by one or more vehicles (e.g., received onboard, received through the network 204, etc.), the vehicle performance manager 202 may utilize data from other sources to improve alternative fuel use, identify fuel-saving opportunities, etc. For example, information sources 216 external to the vehicle performance manager 202 may provide vehicle related information (e.g., manufacture recommendations for battery state of charge, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle performance manager 202; however, other communication techniques may also be implemented (e.g., information from the information sources 216 may be provided through one or more networks such as network 204).

To select and define the quantities such as the alternative fuel capacity of the vehicle (e.g., battery state of charge) and performance measure (e.g., vehicle speed) for attempting to balance the use of the alternative fuel, one or more types of information may be utilized. For example, various types of information may be used to define an appropriate state of charge (e.g., 40% charge), and a performance measure for the vehicle (e.g., 5 mph), etc. may be determined from a variety of information sources. For example, historical information regarding operations of the vehicle (e.g., typical MPG provided by the vehicle during operation), the vehicle operator (e.g., average driving speed of the operator), etc. may factor into quantity selection. Sensor information (e.g., from embedded vehicle sensors, sensing device present in the vehicle, etc.) may also provide information such as vehicle weight, road grade, temperature, etc. that is used to analyze the vehicle's activity and develop the quantities. Vehicles such as delivery vans may frequently be driven in similar manners (e.g., similar driving pattern, operating hours, routes, mileage, cargo being hauled, mannerisms of the drivers, etc.) that may also be represented in the analysis. Such a driving pattern generally is very fuel-inefficient, and rules such as always providing assistance from the electric motor 126 at vehicle start-up may be implemented. From relatively current information (e.g., data provided near real time) and previously collected information (e.g., historical data for a vehicle, a fleet of similar vehicles, etc.), the assistance manager 214 may analyze and produce the quantities for determining amount of assistance needed for each ICE 124. For example, quantities may be determined for an individual vehicle that accounts for data associated with the vehicle and information that accounts for historical patterns of similar vehicles, vehicles operating under similar conditions, etc. Since a fleet of similar vehicles would typically produce larger amounts of information, compared to information generated by a single vehicle, quantities for assistance strategies based upon multiple vehicles (e.g., vehicles operating under similar environmental conditions, vehicles operating in the same general geographical area, the entire vehicle fleet, etc.) may provide more appropriate quantities for determining amount of assistance for efficient use of both the alternative fuel system and the internal combustion engine, for example.

In the illustrated example, to provide assistance functionality, the vehicle performance manager 202 includes a server 218 that is capable of being provided information from the network 204 and the information sources 216. Additionally, the server 218 is illustrated as being in direct communication with a storage device 220 that is located at the vehicle performance manager 202. In this example of the assistance manager 214 being off board a vehicle, in comparison to the assistance manager 102 (of FIG. 1), the assistance manager 214 is executed by the server 218. Provided information from one or more of the sources, quantities and amount of assistance may be developed by the assistance manager 214. Along with determining appropriate amount of assistance for balancing the use of the alternative fuel (e.g., battery state of charge), functionality of the assistance manager 214 may appropriately manage the distribution of the determined quantities and amount of assistance for delivery to one or more corresponding vehicles. For example, one or more database systems, data management architectures, communication schemes may be utilized by the assistance manager 214 for information distribution. In some arrangements, such distribution functionality may be provided partially or fully by the assistance manger 214 or external to the assistance manager. In some arrangements this distribution functionality may be provided by other portions of the vehicle performance manager 202 or provided by another entity separate from the performance manager for distributing amount of assistance and/or other types of information. Further, while a single server (e.g., server 218) is implemented in this arrangement to provide the functionality for the vehicle performance manager 202, additional servers or other types of computing devices may be used to provide the functionality. For example, operations of the assistance manager 214 may be distributed among multiple computing devices located at one or more locations.

Upon one or more quantities and amount of assistance being produced, one or more operations may be executed to provide appropriate information to one or more vehicles. For example, operations of a computing device (e.g., the server 218) located at the vehicle performance manager 202 may provide the information to the appropriate vehicle (or vehicles). By using one or more wireless links the information may be delivered (e.g., through the network 204). In some arrangements one or more trigger events may initiate the information being sent to a vehicle. For example, upon one or more messages, signals, etc. being received at the vehicle performance manager 202 (e.g., that an identified operator has begun driving a particular hybrid vehicle), data representing the appropriate assistance strategy (e.g., a state of charge assistance threshold such as 40%, maximum vehicle speed for which the electric motor 126 should assist the ICE 124, etc.) may be provided to the vehicle. For arrangements in which the analysis is executed onboard the vehicle, quantities associated with an assistance strategy may be identified onboard (e.g., by the assistance manager 102) and provided to appropriate components of the vehicle. In still other arrangements, one or more strategies could be manually loaded onto a vehicle—for example a vehicle could be preloaded with an assistance strategy specific to typical routes, have multiple driver-selectable strategies loaded, etc. Along with providing strategies, updated data may similarly be sent to vehicles to make needed adjustments to previously provided strategies (e.g., adjust initial quantities, update amount of assistance, provide performance limitation metrics, toggle on/off the assistance manager 102, etc.). Adjustments to provided strategies may also be adjusted after delivery to the vehicle. For example, one or more components included in the vehicles may monitor the strategies (e.g., using artificial intelligence algorithms, neural networks, etc.) and make appropriate adjustments (e.g., goal state of charge, amount of assistance) for an electric motor, etc. of the vehicle.

Figure 3:
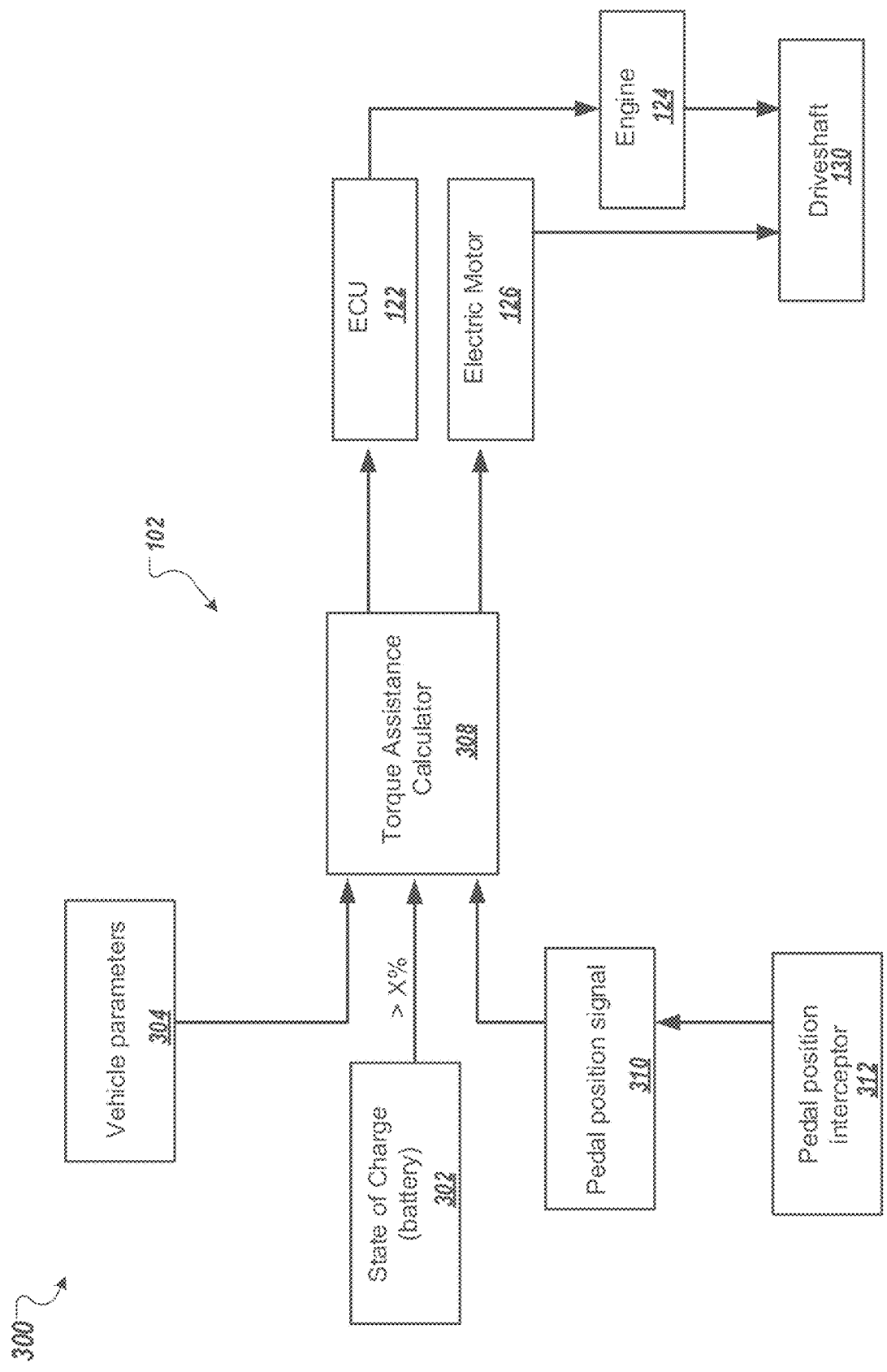
FIG. 3 illustrates a diagram of a torque assistance manager.

Referring to FIG. 3, a system level diagram 300 presents one arrangement for responding to a user's acceleration command in a hybrid electric system by determining and adjusting the amount of torque to supplement that provided by the vehicle's internal combustion engine 124. In general, the diagram 300 presents operational functions of an assistance manager (e.g., the onboard assistance manager 102 of FIG. 1, the off board assistance manager 214 of FIG. 2, etc.) with associated hardware, a combination of onboard and off board managers, etc. The assistance manager mitigates the effect of drivers pressing heavily on the vehicle's accelerator pedal 118, by intercepting the pedal request, deciding on the best combination of battery power and combustible fuel power, and reducing the voltage signal in the request sent to the vehicle engine 124, while still allowing the vehicle to accelerate as the driver has requested. The end result is similar, or reduced, acceleration compared to a traditional system but with a reduced amount of combustible fuel used.

As shown in the diagram 300, a torque assistance calculator 308 modifies signals from the vehicle to optimize proper hybrid assistance to the vehicle. These signals include a state of charge 302 of one or more batteries included in the vehicle. One or more sensors located onboard the vehicle (e.g., SOC calculator 128 in FIG. 1) provide data representative of the state of charge 302. In some implementations, the state of charge 302 may be provided in a time series of data points, or the time series that represents the state of charge 302 may be averaged over a period of time (e.g., the last minute, 10 minutes, one hour).

The torque assistance calculator 308 also receives a pedal position signal 310 from the vehicle. One or more sensors located onboard the vehicle (e.g., pedal position sensor 120 in FIG. 1) provide data or signals representative of the pedal position 310 (e.g. voltage signals). In some arrangements, the pedal position 310 signal may be defined as a percentage of the maximum pedal position (e.g., the pedal is pressed 0%, 25%, 100%). Additionally, the torque assistance calculator 308 also receives signals representing various vehicle parameters 304 from the vehicle. These can include characteristics of the vehicle's transmission, the size of the battery, the driver's driving pattern, maximum state of charge of battery, the vehicle platform, current vehicle speed, details of an anti-lock braking system, traction control system state, steering patterns, temperatures, wheel speeds etc. One or more sensors located onboard the vehicle (e.g., sensors 110 in FIG. 1) provide data or signals representative of these data.

The torque assistance calculator 308 determines the amount of assistance to be provided to the internal combustion engine 124. In this arrangement, the torque assistance calculator 308 uses the received vehicle parameters 304, SOC signal 302, and pedal position 310 from the vehicle to make the calculation. In general, the torque assistance calculator 308 may implement one or more techniques and methodologies to determine the amount of torque that the vehicle's electric motor 126 should provide by adding torque to the driveshaft 130 to supplement or replace torque being provided by the vehicle's internal combustion engine 124. For example, using the provided quantities (the pedal position 310, state of charge 302, and vehicle parameters 304), an amount of assistance may be determined by using one or more mathematical functions (e.g., one or more linear functions that map the pedal position 310 to an amount of assistance), using one or more look-up tables (e.g., to determine an amount of assistance from the performance measure), utilizing other types of numerical relationships, etc. In some arrangements, the amount of torque may be defined as a percentage of the torque that the electric motor 126 is to assist the internal combustion engine 124. However, other quantities, scaling schemes, etc. may be used for defining the amount of torque based upon the pedal position, state of charge, and vehicle speed.

To ensure that the torque assistance calculator 308 can determine the amount of assistance for the electric motor 126 to provide to the ICE 124, the pedal position signal must be read. To do so, the position of the accelerator pedal 118 read by sensor 120 present in the vehicle 100 (FIG. 1) is intercepted by a pedal position interceptor 312 placed between the accelerator pedal 118 and the ECU 122. The torque assistance calculator 308 modifies the signal sent to the ECU 122 (e.g., by modifying a voltage of the pedal position signal 310 and sending the modified voltage signal to the ECU 122). Generally, the ECU 122 determines the amount to increase fuel input to the internal combustion engine 124 in accordance with the modified voltage signal. The amount to increase the fuel input is based on how far the acceleration pedal appears to have been pressed by the user (e.g., the signal determined by the accelerator pedal position sensor 120). However, the voltage signal passed to the ECU 122 by the torque assistance calculator 308 is modified, and the ECU 122 calculates a different (e.g., lower) amount to increase fuel injection into the engine (e.g., provide torque to the driveshaft 130 from the ICE 124).

Along with providing the amount of assistance used to adjust the operations of the internal combustion engine 124 and the electric motor 126, the determined quantities can also be used for further processing and other operations. For example, one or more feedback schemes may be implemented such that the amount of assistance is used for determining future amount of assistance or other quantities to improve use of the alternative fuel system and efficiency of operations of the vehicle.

Figure 4:
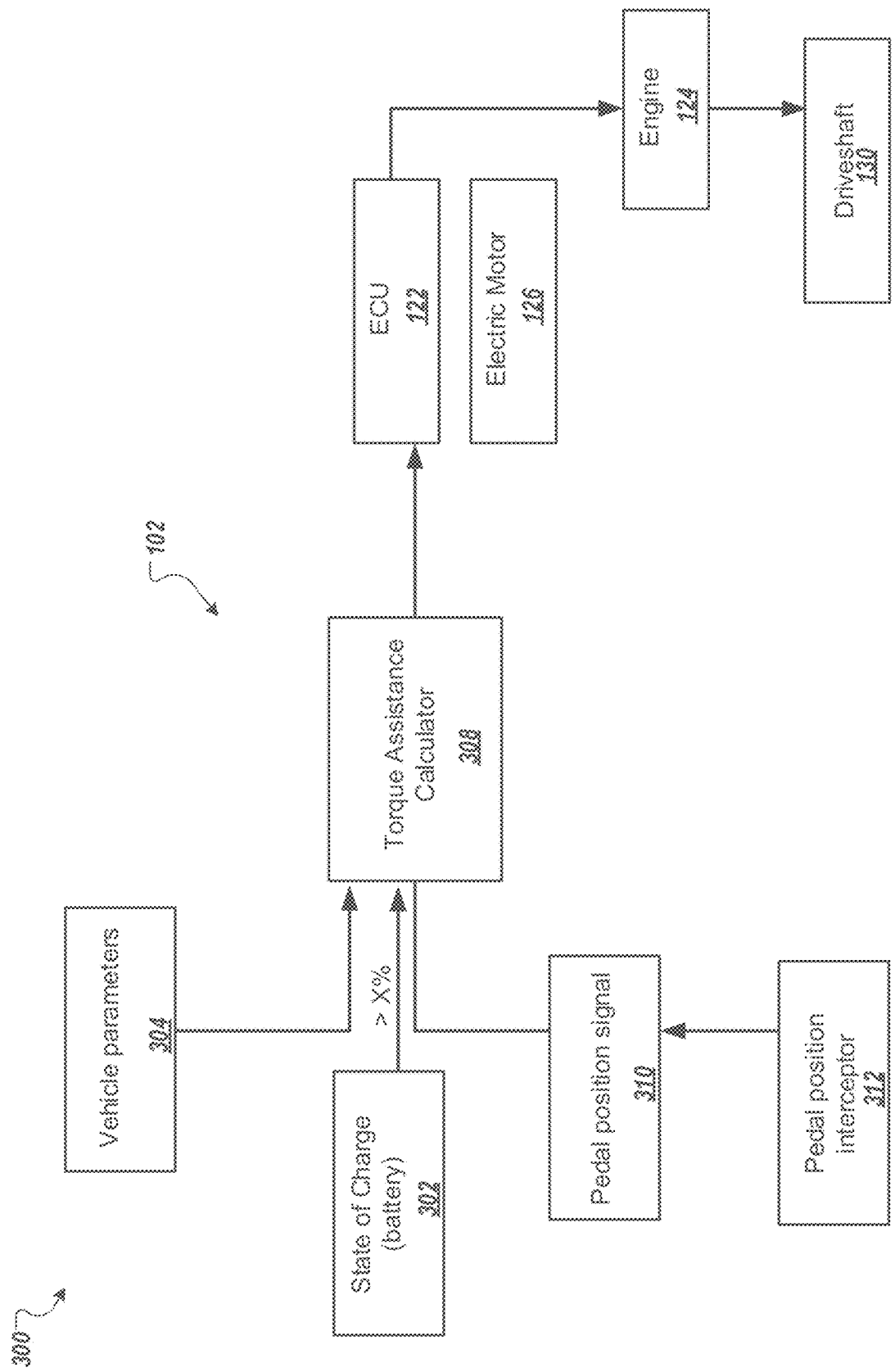
FIG. 4 illustrates a second diagram of a torque assistance manager.

Referring to FIG. 4, system diagram 350 refers to some instances in which the SOC signal 302 may be too low (e.g., below some threshold percentage of full charge) for safe or effective use of the available stored battery power. In this instance, the torque assistance calculator 308 makes no modification to the voltage signal it receives from the pedal position interceptor 312. Instead, the torque assistance calculator 308 passes the pedal position signal 310 through unaltered. As a result, the ECU 122 receives a signal indicating the pedal position 310 as the actual position of the pedal (e.g., the position indicated by the pedal sensor 120). The ECU 122 sends the appropriate throttle control signal, causing the ICE 124 to add torque to the driveshaft 130 unassisted by the electric motor 126.

Figure 5:
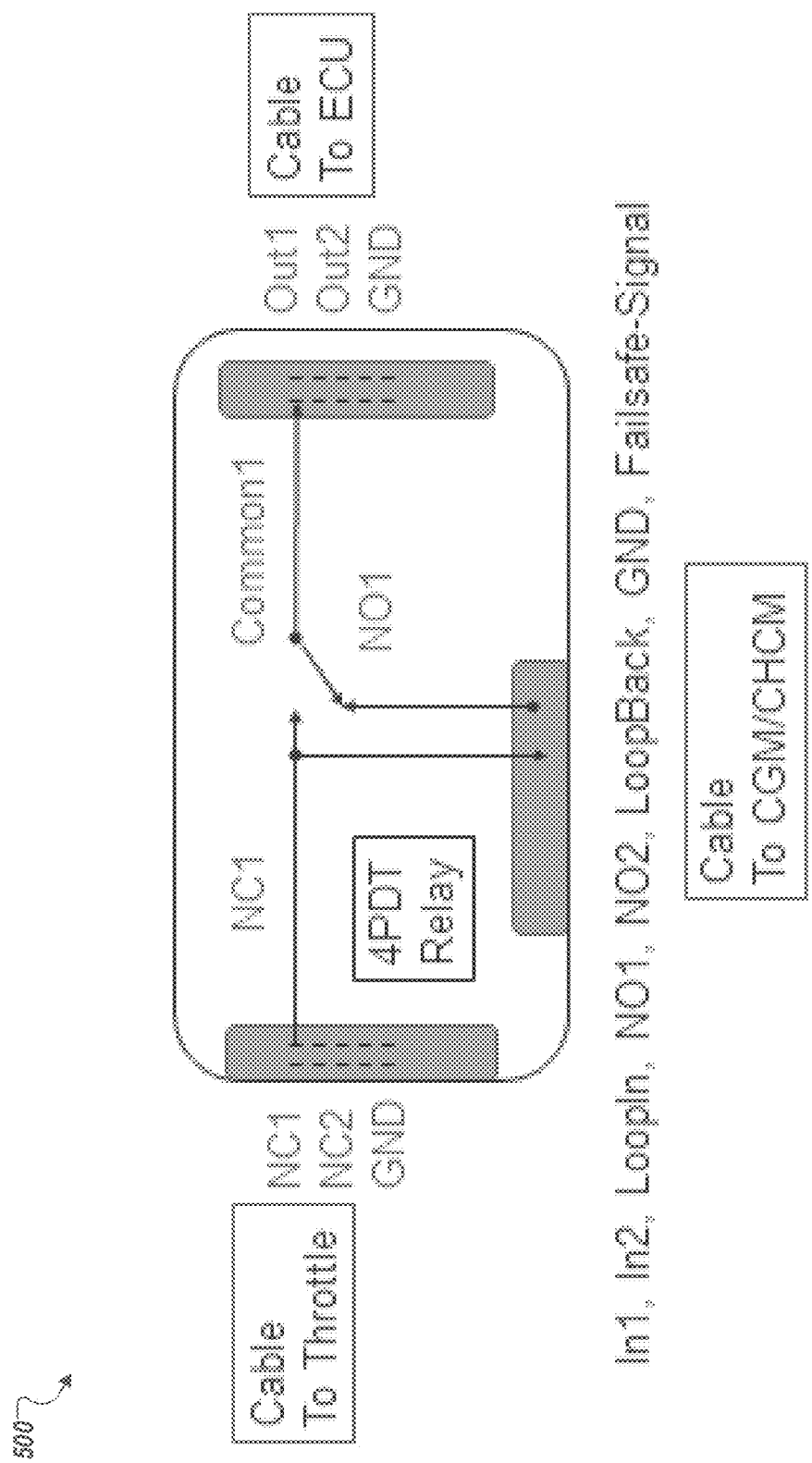
FIG. 5 shows a fail-safe array safety feature.

Referring to FIG. 5, the system includes hardware to select whether to send the unmodified pedal signals to the ECU 122 (FIG. 4) or to send signals modified by the torque assistance calculator 308 to the ECU 122 (FIG. 3), as a safety measure. The fail-safe relay 500 can allow full pass-through of the electrical signals from the accelerator pedal 310 to the ECU 122 when it is not energized. When the relay 500 is energized by the assistance manager 102 of which the torque assistance calculator 308 is part, the relay 500 allows only the signals generated by the torque assistance calculator 308 to be passed to the ECU 122.

Figure 6:
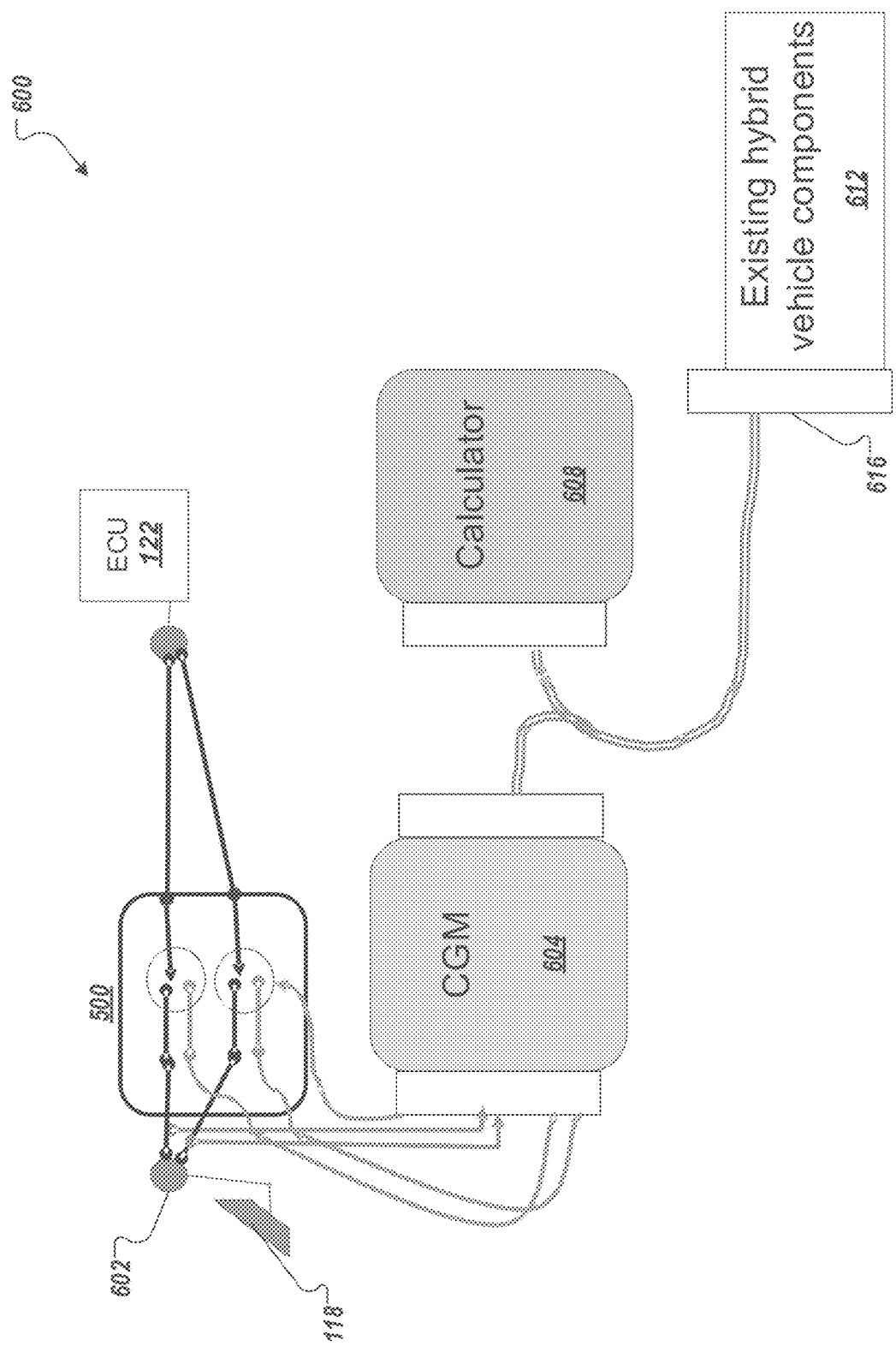
FIG. 6 illustrates hardware and software components of a system implementing a torque assistance manager.

Referring to FIG. 6 a system level diagram 600 presents one arrangement with associated hardware for responding to a user's acceleration command in a hybrid electric system by determining and adjusting the accelerator command signals passed to the ECU 122 that includes a failsafe relay 500. In general, the diagram 600 presents operational functions of an assistance manager (e.g., the onboard assistance manager 102 of FIG. 1 or the off board assistance manager 214 of FIG. 2) with various hardware components connected by connectors 616. A pedal connector 602 (e.g., an S1-Yazaki connector) intercepts the analog signals from the accelerator pedal 118 on the vehicle 100. The pedal connector 602 connects to a custom gateway module 604. The gateway module 604 can include dual processors and dual storage of key inputs (e.g., the SOC) to provide redundancy and improve safety. The voltage signals from the pedal connector 602 are passed to the gateway module 604, which estimates the amount the accelerator pedal 118 was pressed from those voltage signals. This estimated amount is passed to a calculator 608 (e.g., the torque assistance calculator 308), which calculates the assistance and a pass-through trigger for use with the relay 500 using the dynamic variables described above. Those variables (e.g., a percent-pressed value for the accelerator pedal 118 and the pass-through trigger) are sent back to the gateway module 604, which then estimates the voltages needed to achieve the determined dynamic pedal percent and the pass through trigger. These voltages are sent to the failsafe relay 500 and appropriate signals are also sent to the existing hybrid vehicle components 612 (e.g., so that the electric motor is signaled to provide power to the drivetrain 130). The failsafe relay 500 selects between sending the modulated voltages passed in (e.g., as in FIG. 3) or the original voltages from the accelerator pedal 118 (e.g., as in FIG. 4). The selected voltage signals are sent to the ECU 122 which in turn modifies the existing vehicle combustion engine components (the engine, fuel injectors, etc.).

The calculator 608 can leave the relays inside the failsafe relay 500 at their default state, which will pass-through the signals from the accelerator pedal directly 118 to the ECU 122 without interception. This safety feature allows the vehicle 100 to function if the assistance manager is damaged or turned off.

In some instances, the pass-through value determined by the calculator 608 is present so as to conservatively modify the passed-along value. For example, a signal of 90% or greater will be passed through by the calculator 608 (e.g., an instance where a driver is pressing hard on the accelerator pedal 118, possibly in response to some emergency).

Additionally, the ECU 122 broadcasts information that it determines (e.g., the pedal position, fuel-used, miles/odometer, faults, etc.) to other vehicle components. The calculator 608 can detect that broadcast, providing confirmation of the correct signal percentage-pressed determined for the accelerator-pedal (0%-100%).

Figure 7:
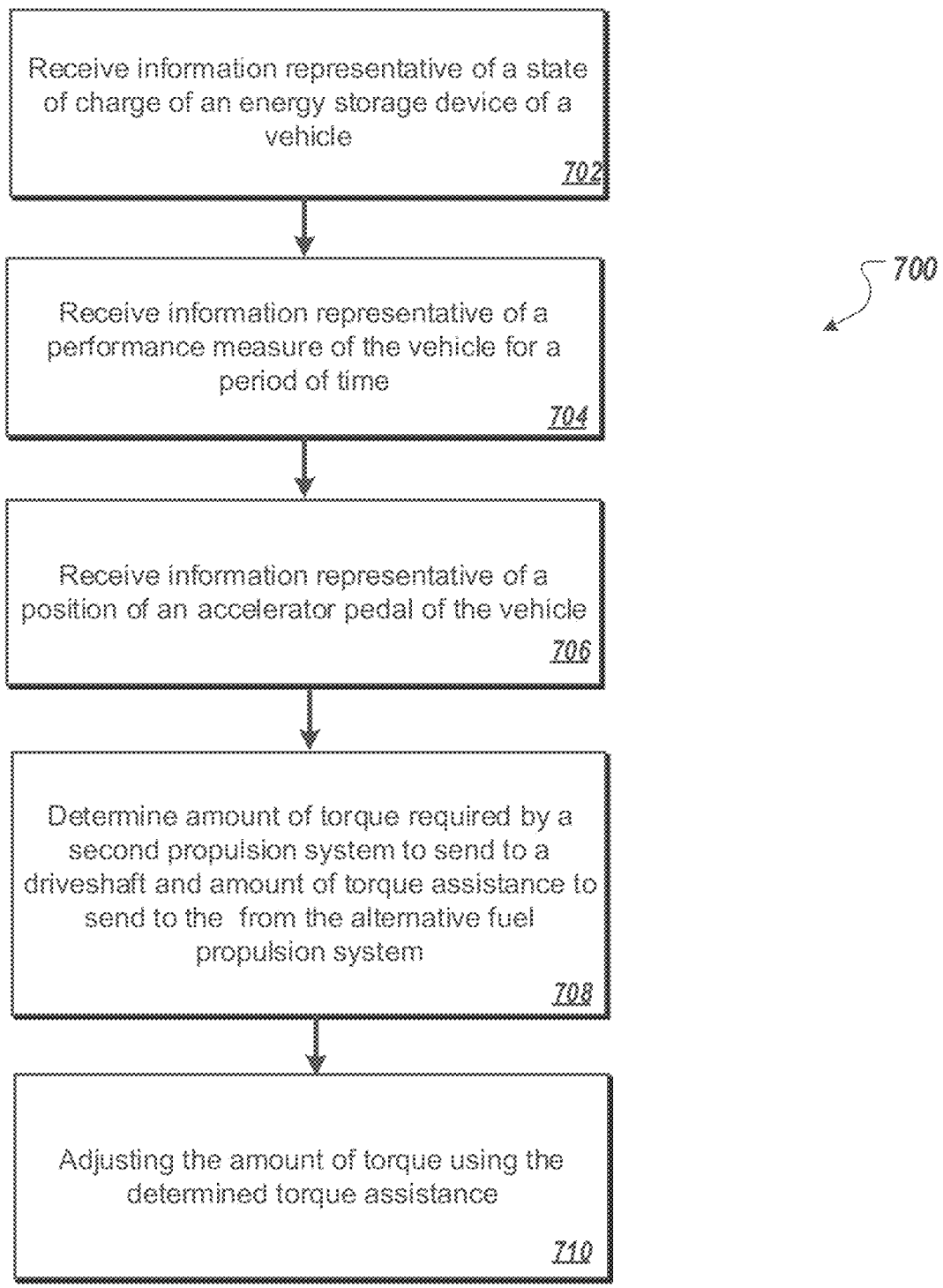
FIG. 7 is a flow chart of representative operations for an assistance manager.

Referring to FIG. 7, a flowchart 700 that represents operations for controlling a hybrid vehicle is described. At step 702 the assistance manager receives information representative of a state of charge of an energy storage device of a vehicle that includes an alternative fuel propulsion system. At step 704 the assistance manager receives information representative of a performance measure of the vehicle for a period of time and at step 706 receives information representative of a position of an accelerator pedal of the vehicle. At step 708 the manager determines an amount of torque required by a second propulsion system to send to a driveshaft of the vehicle. This is determined from the information representative of a position of a pedal received and an amount of torque assistance required to send to the driveshaft of the vehicle from the alternative fuel propulsion system included in the vehicle from the information representative of a performance measure of the vehicle and the information representative of the state of charge. Finally, at step 710 the manager adjusts the amount of torque using the determined torque assistance.

The signal modification produced by the assistance manager 102 is not static. Rather, the signal modification is a dynamic pedal change system, adapting the signals sent to the driveshaft depending on battery charge, vehicle speed, and various other inputs monitored by the hybrid system (e.g., characteristics of the vehicle's transmission, the size of battery, the driver's driving pattern, state of charge of battery, the vehicle platform, etc.). This dynamic adaptability is advantageous as it can maximize fuel efficiency depending on the vehicle system to which it is applied. For example, a hybrid electric vehicle with a small battery (e.g., an older HEV or small HEV) needs to closely manage when is the best time to use the electric power as opposed to engine power, as there is limited SOC available. Thus, it is most effective to limit use of the available electric power to when the internal combustion engine is at its least efficient. For example, when the engine is at low speeds there is little torque and so the engine gears down, thereby inefficiently using a lot of fuel until the vehicle reaches higher, more engine-efficient speeds. By contrast, at highway speeds the engine and transmission run efficiently; accordingly the assistance manager 102 can include logic to not supplement the engine's torque or power at certain speeds (e.g., at certain voltage signals from the accelerator pedal). For such a vehicle system, the vehicle may initially run on battery power only (e.g., for the first few miles, or first few minutes, or first range of speeds) while allowing the engine to idle.

Implementing the strategy of dynamically changing a vehicle's operation or not depends on the vehicle type, and is applicable to hybrid plug-in systems that use a larger battery. In this instance, more power is available due to the larger battery size, and the system can be less restricted in applying torque from the stored alternative energy source. The battery and hybrid system can respond to a driver's input for a wider range of speeds, even up to full vehicle speed, while running only on battery power.

The systems and techniques described have an additional safety feature, in that the logic to change the signals leaving the accelerator pedal can be turned on and off (either by a driver, or remotely). As described with respect to FIG. 6, the calculator 608 can always pass through the unmodified electric signal from the pedal 118 (e.g., as in the setup of FIG. 4). A signal can be sent to release the failsafe relay 500 so that the signal transmitted from the pedal to the ECU 122 and bypasses the calculator 608 (and 604) completely. If the calculator 608 fails, the failsafe relay 500 remains open so that the signal goes directly from the pedal 118 to the ECU 122, as dictated by the original equipment design (without the modifications described). This safety feature may be useful when operating conditions change. For example, if a vehicle's combustion system is not functioning properly (e.g., the fuel injector is not working correctly or a fuel line is clogged), it may be beneficial to not affect the signals sent to the internal combustion engine 123. A user may send a signal to turn off the assist feature of the assistance manager 102 until the vehicle can be brought in for maintenance. This signal can be sent by the vehicle's driver (e.g., using the user interaction devices 108 in the vehicle). In some instances, this signal can be sent from a remote site (e.g., from the vehicle performance manager 202 located at a central site remote from the vehicle).

The ability to turn off the assist feature can also be used for testing the system during install, in order to validate the signals going the engine.

In some embodiments, the system may reduce the signal of the drivers request for pedal acceleration, even if there is no SOC available. The system may place a top limit or maximum pedal acceleration value, even with no SOC, limiting the maximum amount that the accelerator pedal appears to be pressed. With or without a hybrid system (or in a hybrid system where the SOC is zero), when the driver steps on the pedal from zero to a high percentage, the assistance manager is able to change the voltage to indicate a slower rate. The system may also limit the rate of change of the driver stepping on the accelerator pedal, to help reduce wasted fuel. By intercepting and modifying the voltage signal change rate, the vehicle accelerates much more gently. The maximum voltage change rate can be modified at install, or a command to change the rate can be sent from a remote location.

Similarly, the system can modulate the apparent pedal position to restrict the vehicle to a maximum speed, e.g., the calculator 608 has a maximum value that it will pass through to the ECU 122 and to the driveshaft 130.

In some instances, the signal behavior can be binned by dynamically sectioning off behaviors due to vehicle conditions or input. In one example, the fleet manager may wish to set a 65 mph limit (e.g., by sending a signal to the assistance manager 102 via the network 204) on their fleet of trucks. The trucks in the fleet have known engine capabilities, including that the engines have ample power to achieve 65 mph at 78% acceleration pedal press. The signals can be binned to account for this cut-off: one behavior can be implemented from 0 to 78% pedal press (e.g., allowing an original or modified acceleration signal to pass to the drivetrain) and a second behavior from 78% to 100% (e.g. allowing zero signal to the drivetrain and so capping speed at 65 mph).

In some instances, field tuning can smooth out some bad driving habits. For example, some drivers heavily modulate the pedal at steady speed (unnecessarily speeding up and slowing down around the average driving speed). These actions are small variations in accelerator pedal position. The systems described can intercepts those variations in the accelerator signal and cause the electric motor to provide much of that positive and negative torque, thereby saving gas.

Figure 8:
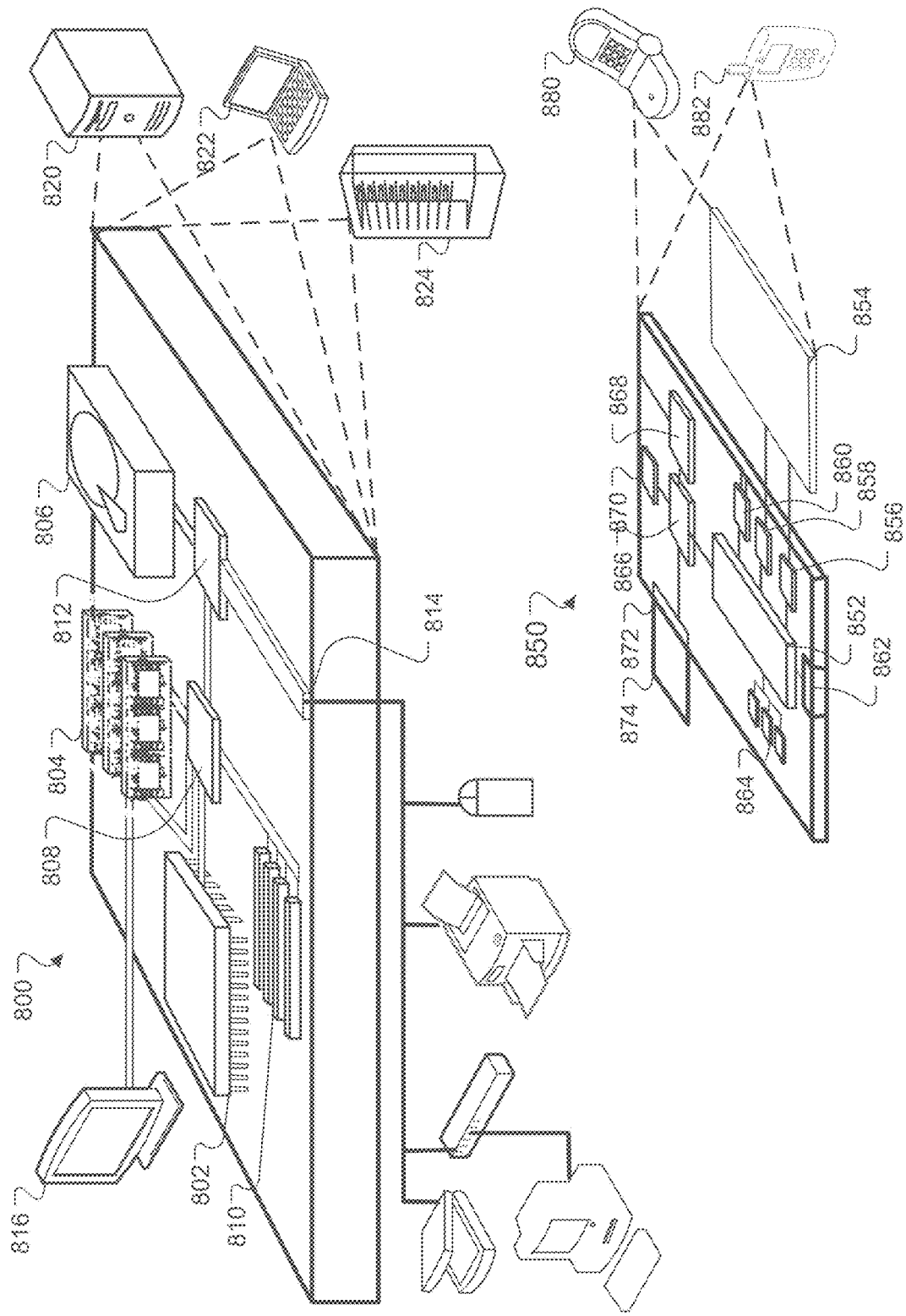
FIG. 8 is a block diagram of computing devices and systems.

FIG. 8 shows an example of example computer device 800 and example mobile computer device 850, which can be used to implement the techniques described herein. For example, a portion or all of the operations of an assistance manager (e.g., the assistance manger 102 shown in FIG. 1, the assistance manager 214 shown in FIG. 2, etc.) may be executed by the computer device 800 and/or the mobile computer device 850. Computing device 800 is intended to represent various forms of digital computers, including, e.g., laptops, desktops, workstations, personal digital assistants, servers, blade servers, mainframes, and other appropriate computers. Computing device 850 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 800 includes processor 802, memory 804, storage device 806, high-speed interface 808 connecting to memory 804 and high-speed expansion ports 810, and low speed interface 812 connecting to low speed bus 814 and storage device 806. Each of components 802, 804, 806, 808, 810, and 812, are interconnected using various busses, and can be mounted on a common motherboard or in other manners as appropriate. Processor 802 can process instructions for execution within computing device 800, including instructions stored in memory 804 or on storage device 806 to display graphical data for a GUI on an external input/output device, including, e.g., display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

Memory 804 stores data within computing device 800. In one implementation, memory 804 is a volatile memory unit or units. In another implementation, memory 804 is a non-volatile memory unit or units. Memory 804 also can be another form of computer-readable medium, including, e.g., a magnetic or optical disk.

Storage device 806 is capable of providing mass storage for computing device 800. In one implementation, storage device 806 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 804, storage device 806, memory on processor 802, and the like.

High-speed controller 808 manages bandwidth-intensive operations for computing device 800, while low speed controller 812 manages lower bandwidth-intensive operations. Such allocation of functions is an example only. In one implementation, high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 800 can be implemented in a number of different forms, as shown in the figure. For example, it can be implemented as standard server 820, or multiple times in a group of such servers. It also can be implemented as part of rack server system 824. In addition or as an alternative, it can be implemented in a personal computer including, e.g., laptop computer 822. In some examples, components from computing device 800 can be combined with other components in a mobile device (not shown), including, e.g., device 850. Each of such devices can contain one or more of computing device 800, 850, and an entire system can be made up of multiple computing devices 800, 850 communicating with each other.

Computing device 850 includes processor 852, memory 864, an input/output device including, e.g., display 854, communication interface 866, and transceiver 868, among other components. Device 850 also can be provided with a storage device, including, e.g., a microdrive or other device, to provide additional storage. Each of components 850, 852, 864, 854, 866, and 868, are interconnected using various buses, and several of the components can be mounted on a common motherboard or in other manners as appropriate.

Processor 852 can execute instructions within computing device 850, including instructions stored in memory 864. The processor can be implemented as a chipset of chips that include separate and multiple analog and digital processors. The processor can provide, for example, for coordination of the other components of device 850, including, e.g., control of user interfaces, applications run by device 850, and wireless communication by device 850.

Processor 852 can communicate with a user through control interface 858 and display interface 856 coupled to display 854. Display 854 can be, for example, a TFT LCD (Thin-Film-Transistor Liquid Crystal Display) or an OLED (Organic Light Emitting Diode) display, or other appropriate display technology. Display interface 856 can comprise appropriate circuitry for driving display 854 to present graphical and other data to a user. Control interface 858 can receive commands from a user and convert them for submission to processor 852. In addition, external interface 862 can communicate with processor 842, so as to enable near area communication of device 850 with other devices. External interface 862 can provide, for example, for wired communication in some implementations, or for wireless communication in other implementations, and multiple interfaces also can be used.

Memory 864 stores data within computing device 850. Memory 864 can be implemented as one or more of a computer-readable medium or media, a volatile memory unit or units, or a non-volatile memory unit or units. Expansion memory 874 also can be provided and connected to device 850 through expansion interface 872, which can include, for example, a SIMM (Single In Line Memory Module) card interface. Such expansion memory 874 can provide extra storage space for device 850, or also can store applications or other data for device 850. Specifically, expansion memory 874 can include instructions to carry out or supplement the processes described above, and can include secure data also. Thus, for example, expansion memory 874 can be provided as a security module for device 850, and can be programmed with instructions that permit secure use of device 850. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 864, expansion memory 874, and/or memory on processor 852, which can be received, for example, over transceiver 868 or external interface 862.

Device 850 can communicate wirelessly through communication interface 866, which can include digital signal processing circuitry where necessary. Communication interface 866 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, including, e.g., using a Bluetooth®, Wi-Fi, or other such transceiver (not shown). In addition, GPS (Global Positioning System) receiver module 870 can provide additional navigation- and location-related wireless data to device 850, which can be used as appropriate by applications running on device 850.

Device 850 also can communicate audibly using audio codec 860, which can receive spoken data from a user and convert it to usable digital data. Audio codec 860 can likewise generate audible sound for a user, including, e.g., through a speaker, e.g., in a handset of device 850. Such sound can include sound from voice telephone calls, can include recorded sound (e.g., voice messages, music files, and the like) and also can include sound generated by applications operating on device 850.

Computing device 850 can be implemented in a number of different forms, as shown in the figure. For example, it can be implemented as cellular telephone 880. It also can be implemented as part of smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
   receiving information representative of a state of charge of an energy storage device of a vehicle that includes an alternative fuel propulsion system;
   receiving information representative of a performance measure of the vehicle for a period of time;
   receiving information representative of a position of an accelerator pedal of the vehicle, the information representative of the position of the accelerator pedal representing a travel percentage of the accelerator pedal;
   determining an amount of torque assistance required to send to a driveshaft of the vehicle from the alternative fuel propulsion system included in the vehicle from the information representative of the performance measure of the vehicle, the information representative of the state of charge, and the information representative of the position of the accelerator pedal; and
   adjusting an amount of torque required by a second propulsion system using the determined torque assistance.

2. The computing device-implemented method of claim 1, wherein the second propulsion system includes an internal combustion engine and the alternative fuel propulsion system is an electric motor-based system.

3. The computing device-implemented method of claim 1, comprising sending the determined torque assistance to the driveshaft of the vehicle.

4. The computing device-implemented method of claim 1, wherein the performance measure represents a speed of the vehicle.

5. The computing device-implemented method of claim 1, wherein determining the amount of torque assistance comprises setting the torque assistance to zero when the information representative of the state of charge indicates that the state of charge is less than a threshold amount.

6. The computing device-implemented method of claim 1, comprising limiting a maximum amount of torque to send to the driveshaft.

7. The computing device-implemented method of claim 1, wherein adjusting the torque comprises energizing a relay.

8. The computing device-implemented method of claim 1, comprising determining an amount of torque required by the second propulsion system to send to the driveshaft of the vehicle from the received information representative of the position of the accelerator pedal.

9. The computing device-implemented method of claim 1, wherein the received information representative of the position of the accelerator pedal of the vehicle is provided by one or more voltage signals of a pedal position sensor associated with the accelerator pedal.

10. The computing device-implemented method of claim 9, comprising:
    modifying the one or more voltage signals of the pedal position sensor based on the determined amount of torque assistance; and
    sending the modified one or more voltage signals to a controller of the vehicle to adjust the amount of torque required by the second propulsion system based on the modified one or more voltage signals.

11. A system comprising:
    a computing device comprising:
        a memory configured to store instructions; and
        a processor to execute the instructions to perform operations comprising:
            receiving information representative of a state of charge of an energy storage device of a vehicle that includes an alternative fuel propulsion system;
            receiving information representative of a performance measure of the vehicle for a period of time;
            receiving information representative of a position of an accelerator pedal of the vehicle, the information representative of the position of the accelerator pedal representing a travel percentage of the accelerator pedal;
            determining an amount of torque assistance required to send to a driveshaft of the vehicle from the alternative fuel propulsion system included in the vehicle from the information representative of the performance measure of the vehicle, the information representative of the state of charge, and the information representative of the position of the accelerator pedal; and adjusting an amount of torque required by a second propulsion system using the determined torque assistance.

12. The system of claim 11, wherein the second propulsion system includes an internal combustion engine and the alternative fuel propulsion system is an electric motor-based system.

13. The system of claim 11, comprising sending the determined torque assistance to the driveshaft of the vehicle.

14. The system of claim 11, wherein the performance measure represents a speed of the vehicle.

15. The system of claim 11, wherein determining the amount of torque assistance comprises setting the torque assistance to zero when the information representative of the state of charge indicates that the state of charge is less than a threshold amount.

16. The system of claim 11, comprising limiting a maximum amount of torque to send to the driveshaft.

17. The system of claim 11, wherein adjusting the torque comprises energizing a relay.

18. The system of claim 11, comprising determining an amount of torque required by the second propulsion system to send to the driveshaft of the vehicle from the received information representative of the position of the accelerator pedal.

19. The system of claim 11, wherein the received information representative of the position of the accelerator pedal of the vehicle is provided by one or more voltage signals of a pedal position sensor associated with the accelerator pedal.

20. The system of claim 19, comprising:
modifying the one or more voltage signals of the pedal position sensor based on the determined amount of torque assistance; and
sending the modified one or more voltage signals to a controller of the vehicle to adjust the amount of torque required by the second propulsion system based on the modified one or more voltage signals.

21. One or more computer readable media storing instructions that are executable by a processing device, and upon such execution cause the processing device to perform operations comprising:
receiving information representative of a state of charge of an energy storage device of a vehicle that includes an alternative fuel propulsion system;
receiving information representative of a performance measure of the vehicle for a period of time;
receiving information representative of a position of an accelerator pedal of the vehicle the information representative of the position of the accelerator pedal representing a travel percentage of the accelerator pedal;
determining an amount of torque assistance required to send to a driveshaft of the vehicle from the alternative fuel propulsion system included in the vehicle from the information representative of the performance measure of the vehicle, the information representative of the state of charge, and the information representative of the position of the accelerator pedal; and
adjusting an amount of torque required by a second propulsion system using the determined torque assistance.

22. The one or more computer readable media of claim 21, wherein the second propulsion system includes an internal combustion engine and the alternative fuel propulsion system is an electric motor-based system.

23. The one or more computer readable media of claim 21, comprising sending the determined torque assistance to the driveshaft of the vehicle.

24. The one or more computer readable media of claim 21, wherein the performance measure represents a speed of the vehicle.

25. The one or more computer readable media of claim 21, wherein determining the amount of torque assistance comprises setting the torque assistance to zero when the information representative of the state of charge indicates that the state of charge is less than a threshold amount.

26. The one or more computer readable media of claim 21, comprising limiting a maximum amount of torque to send to the driveshaft.

27. The one or more computer readable media of claim 21, wherein adjusting the torque comprises energizing a relay.

28. The one or more computer readable media of claim 21, comprising determining an amount of torque required by the second propulsion system to send to the driveshaft of the vehicle from the received information representative of the position of the accelerator pedal.

29. The one or more computer readable media of claim 21, wherein the received information representative of the position of the accelerator pedal of the vehicle is provided by one or more voltage signals of a pedal position sensor associated with the accelerator pedal.

30. The one or more computer readable media of claim 29, comprising:
modifying the one or more voltage signals of the pedal position sensor based on the determined amount of torque assistance; and
sending the modified one or more voltage signals to a controller of the vehicle to adjust the amount of torque required by the second propulsion system based on the modified one or more voltage signals.

* * * * *

UNITED STATES PATENT AND TRADEMARK OFFICE
CERTIFICATE OF CORRECTION

| | |
|---|---|
| PATENT NO. | : 11,345,327 B2 |
| APPLICATION NO. | : 16/531527 |
| DATED | : May 31, 2022 |
| INVENTOR(S) | : Bill Passman and Tejas Chafekar |

It is certified that error appears in the above-identified patent and that said Letters Patent is hereby corrected as shown below:

In the Claims

Column 21, Line 49 Claim 21, delete "vehicle" and insert -- vehicle, --.

Signed and Sealed this
Twelfth Day of July, 2022

Katherine Kelly Vidal
*Director of the United States Patent and Trademark Office*